(12) United States Patent
Brinkmann et al.

(10) Patent No.: US 11,408,334 B2
(45) Date of Patent: Aug. 9, 2022

(54) CONTROLLING THE POSITION OF TURBINE GUIDE VANES AND OF A COOLANT FLOW

(71) Applicant: Ford Global Technologies, LLC, Dearborn, MI (US)

(72) Inventors: Franz J. Brinkmann, Huerth-Efferen (DE); Ludwig Stump, Cologne (DE); Carsten Weber, Leverkusen (DE); Stefan Quiring, Leverkusen (DE); Kai Kuhlbach, Bergisch Gladbach (DE); Jan Mehring, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 17/110,171

(22) Filed: Dec. 2, 2020

(65) Prior Publication Data
US 2021/0164385 A1 Jun. 3, 2021

(30) Foreign Application Priority Data
Dec. 2, 2019 (DE) .......................... 102019218710.2

(51) Int. Cl.
*F02B 39/00* (2006.01)
*F02B 37/24* (2006.01)
*F02D 41/00* (2006.01)

(52) U.S. Cl.
CPC ............ *F02B 39/005* (2013.01); *F02B 37/24* (2013.01); *F02D 41/0007* (2013.01); *F05D 2220/40* (2013.01); *F05D 2260/20* (2013.01)

(58) Field of Classification Search
CPC ........ F02B 39/005; F02B 37/24; F02B 39/00; F02B 29/0475; F02B 39/16; F02D 41/0007; F02D 23/00; F05D 2220/40; F05D 2260/20; Y02T 10/12
See application file for complete search history.

(56) References Cited

U.S. PATENT DOCUMENTS

| 9,670,823 B2 | 6/2017 | Hayman et al. |
| 2011/0008158 A1* | 1/2011 | Boening .................. F02C 6/12 |
| | | 415/200 |
| 2011/0180026 A1 | 7/2011 | Heusler |
| 2016/0076432 A1 | 3/2016 | Kindl et al. |

FOREIGN PATENT DOCUMENTS

| DE | 102017200086 A1 | 7/2017 |
| DE | 102016206954 A1 | 10/2017 |
| FR | 3057025 A1 | 4/2018 |
| JP | S60228729 A | 11/1985 |
| JP | 2009243277 A | 10/2009 |
| JP | 2013002307 A | 1/2013 |

* cited by examiner

*Primary Examiner* — Audrey B. Walter
*Assistant Examiner* — Edward Bushard
(74) *Attorney, Agent, or Firm* — Vincent Mastrogiacomo; McCoy Russell LLP

(57) ABSTRACT

Methods and systems are provided for a turbocharger system. In one example, a system comprises an actuator configured to adjust a position of a plurality of guide vanes and a position of a coolant valve configured to adjust coolant flow through a turbine coolant jacket or a compressor coolant jacket.

19 Claims, 9 Drawing Sheets

CONTROLLING THE POSITION OF TURBINE GUIDE VANES AND OF A COOLANT FLOW

CROSS-REFERENCE TO RELATED APPLICATIONS

The present application claims priority to German Patent Application No. 102019218710.2 filed on Dec. 2, 2019. The entire contents of the above-listed application is hereby incorporated by reference for all purposes.

FIELD

The present description relates generally to an assembly of an exhaust turbocharger comprising a turbine having guide vanes that can be moved by means of an actuator, wherein the actuator likewise controls a valve in a cooling jacket, and to a method for controlling the guide vanes and the valve.

BACKGROUND/SUMMARY

Exhaust turbochargers may be provided to increase the efficiency of internal combustion engines. Here, some of the energy of the exhaust gas from an internal combustion engine may be used to drive a turbine wheel, which drives a compressor for the intake air of the internal combustion engine via a shaft. An exhaust turbocharger may comprise three main components, each having separate casings, namely the turbine, the compressor, and the shaft connecting the turbine and the compressor for conjoint rotation.

In modern turbines, movable guide vanes may be used to control the exhaust gas flow in the spiral casing of the turbine. The term variable geometry of the turbine is also used in this context (FR 3057025 A). Here, the guide vanes are movable about an axis in the region of their fastening, wherein the movement is effected by an actuator. At an angle of 0%, the guide vanes direct the exhaust gas flow fully onto the rotor blades in order to drive the turbine wheel and, in corresponding fashion, the wheel of the compressor. This setting may be selected at low speeds of the internal combustion engine. At an angle of 100%, the guide vanes may direct the exhaust gas flow completely past the rotor blades, with the result that the turbine wheel may not be driven in this case. This setting may be implemented at high speeds of the internal combustion engine. All percentage angular settings of the guide vanes between said settings are possible in order to control the power of the internal combustion engine.

At high loads and a high speed, the exhaust gas temperatures can reach high temperatures, which may degrade materials of the turbine in the inlet region and at the turbine wheel. To provide a relatively cool exhaust gas, enrichment of the exhaust gas may be performed by injecting additional fuel into the cylinders of the internal combustion engine. However, this procedure increases fuel consumption and the production of pollutants in the exhaust gas, for which reason this practice will no longer be allowed by future exhaust standards. Cooling the exhaust gas is also possible by dissipating heat via a fluid coolant, as described, for example, in US 2011/180026 A, JP 2013002307 A, US 2016/076432 A1, JP S60228729 A, US 2011/008158 A1 and U.S. Pat. No. 9,670,823 B2. If, on the other hand, hot exhaust gas is desired e.g. for the operation of catalytic converters for exhaust gas aftertreatment which are arranged in the exhaust tract, cooling of the turbine is counterproductive.

Coolant may be used to cool compressors of an exhaust turbocharger. In the case of a compressor of an exhaust turbocharger, the material of the compressor wheel is exposed to high temperatures under conditions of high load. Moreover, there is the likelihood in this case of carbon deposits on the diffuser region of the compressor. At high loads, cooling of the compressor is therefore desirable to mitigate degradation to the material of the compressor and provide cooling of the air to be compressed. This has a positive effect on compressor efficiency and the combustion process of the internal combustion engine. At low loads, it is better not to cool the compressor because, if the coolant is also used to cool the internal combustion engine, it could heat the charge air in an unwanted manner.

In FR 3,057,025 A, a turbine cooling device comprises a coolant circulation circuit. The turbine cooling device comprises a coolant circulation actuator which is controlled as a function of an exhaust gas temperature emitted by the engine. The turbine further comprises blades actuatable to various positions to affect a flow rate and angle of exhaust gas onto the turbine wheel.

However, the inventors have identified some issues with the approaches described above. For example, the turbocharger of FR 3,057,025 A comprises multiple actuators, one configured to adjust a coolant valve and another configured to adjust blades of the turbine. This may be undesired as packaging two actuators into the turbocharger increases its space demands. Furthermore, packaging multiple actuators into a small space may be difficult, which may further increase a manufacturing cost and complexity, resulting in delayed assembly times.

In one example, the issues described above may be addressed by a system for a turbocharger comprising an actuator configured to adjust a position of a plurality of guide vanes and a position of a turbocharger coolant valve. In this way, a packaging size of the turbocharger may be reduced.

As one example, the turbocharger coolant valve is configured to adjust coolant flow through water jackets in a turbine housing or a compressor housing. The actuator may move each of the guide vanes and the coolant valve in response to an engine load and/or engine speed. By doing this, a single actuator may be used to adjust coolant flows and exhaust gas flow to the turbine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
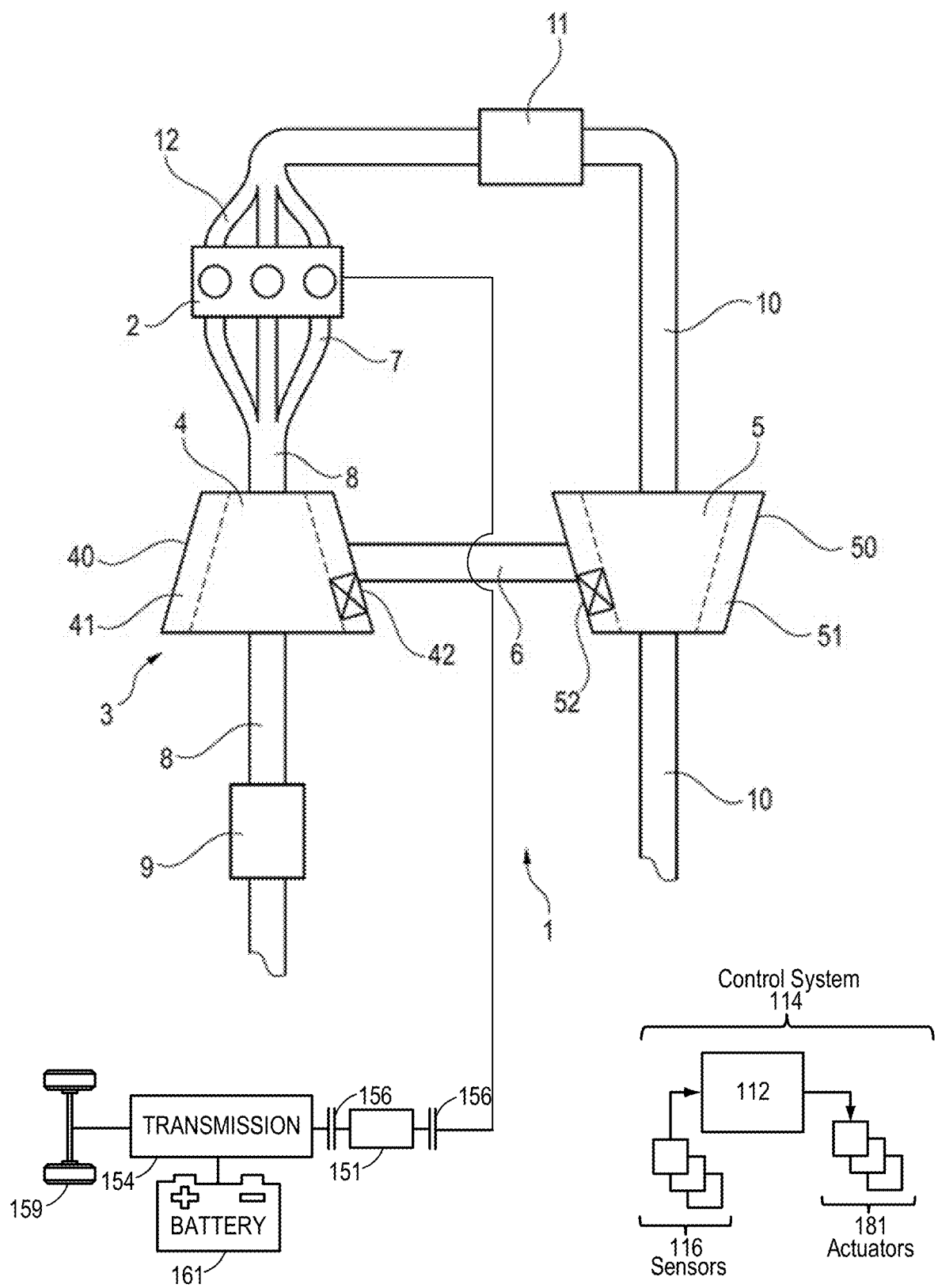
FIG. 1 shows a schematic illustration of one embodiment of an exhaust turbocharger.
Figure 2A:
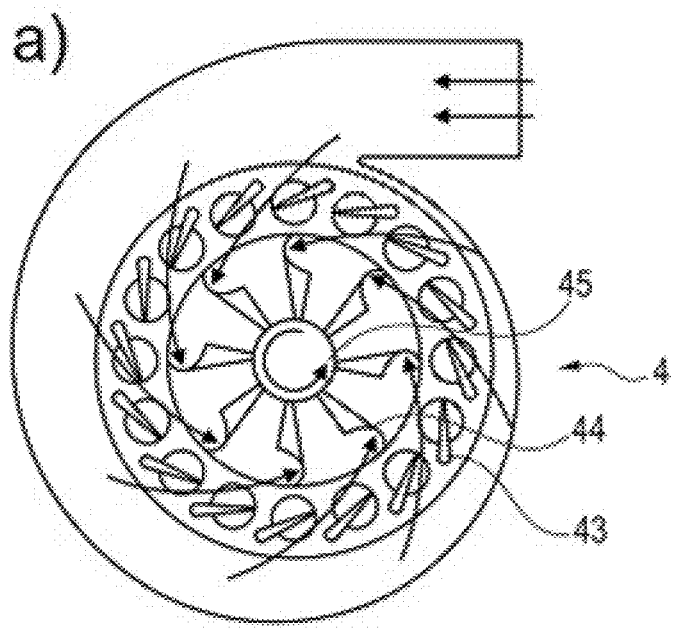
FIG. 2A and FIG. 2B show an illustration of a turbine with movable guide vanes.
Figure 2B:
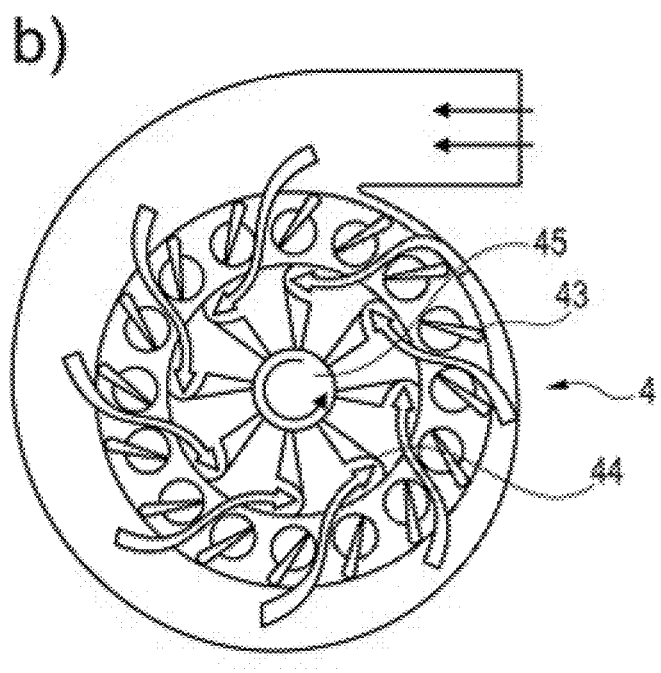

The following description relates to systems and methods for a turbocharger. The turbocharger may be configured as a variable geometry turbocharger, as illustrated in FIG. 1. Guides vanes of the turbocharger may be adjusted from a fully closed position (e.g., 0%) to a fully open position (e.g., 100%), as illustrated in FIGS. 2A and 2B.

Figure 3:
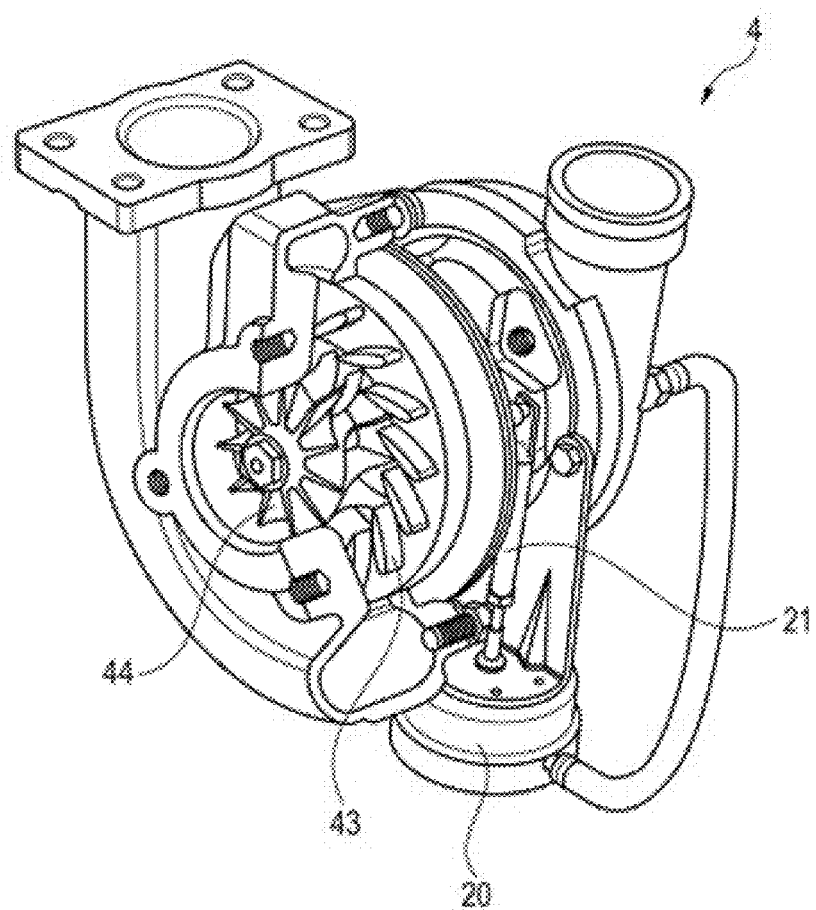
FIG. 3 shows a cutaway illustration of a turbine.
Figure 4:
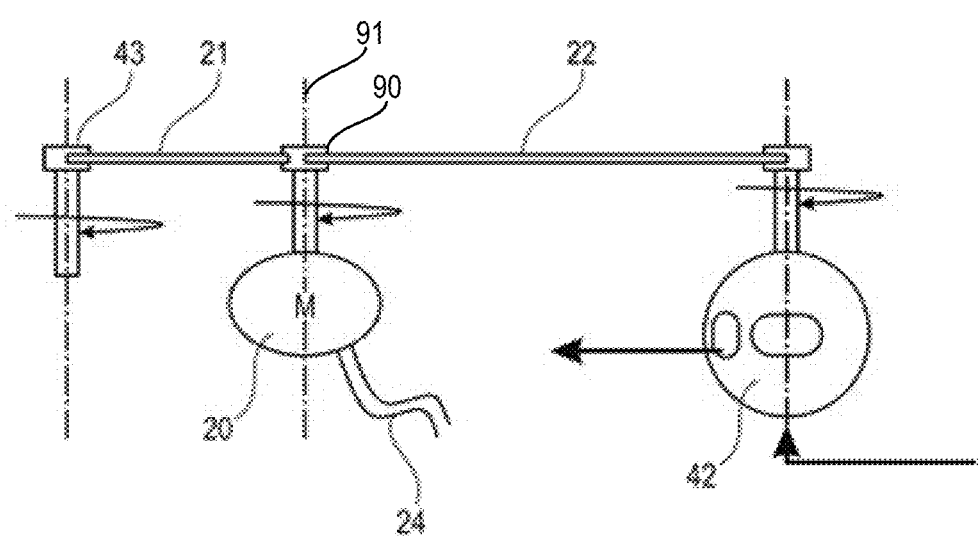
FIG. 4 shows a schematic illustration of one embodiment of the assembly.
Figure 5:
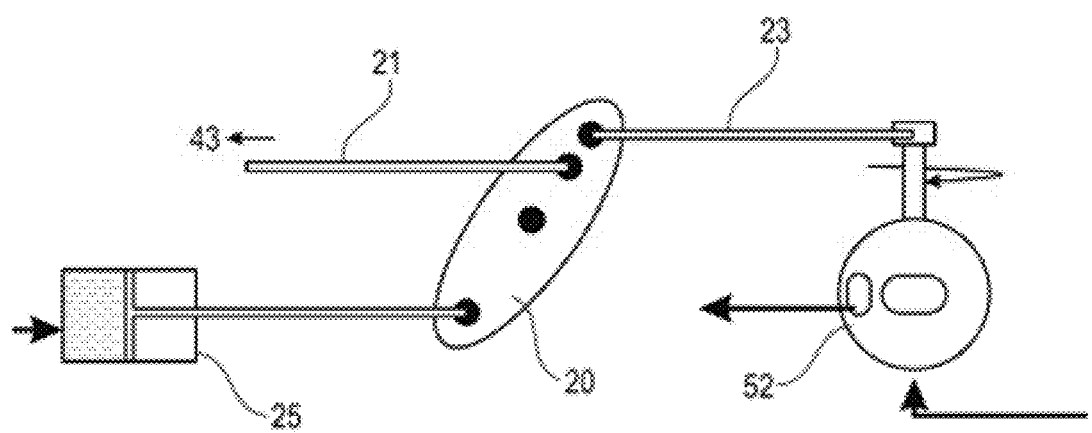
FIG. 5 shows a schematic illustration of another embodiment of the assembly.

A perspective view of the turbocharger is illustrated in FIG. 3. A first embodiment of an actuator configured to adjust positions of the guide vanes and a position of a coolant control valve is illustrated in FIG. 4. A second embodiment of the actuator configured to adjust positions of the guide vanes and the position of the coolant control valve is illustrated in FIG. 5.

Figure 6:
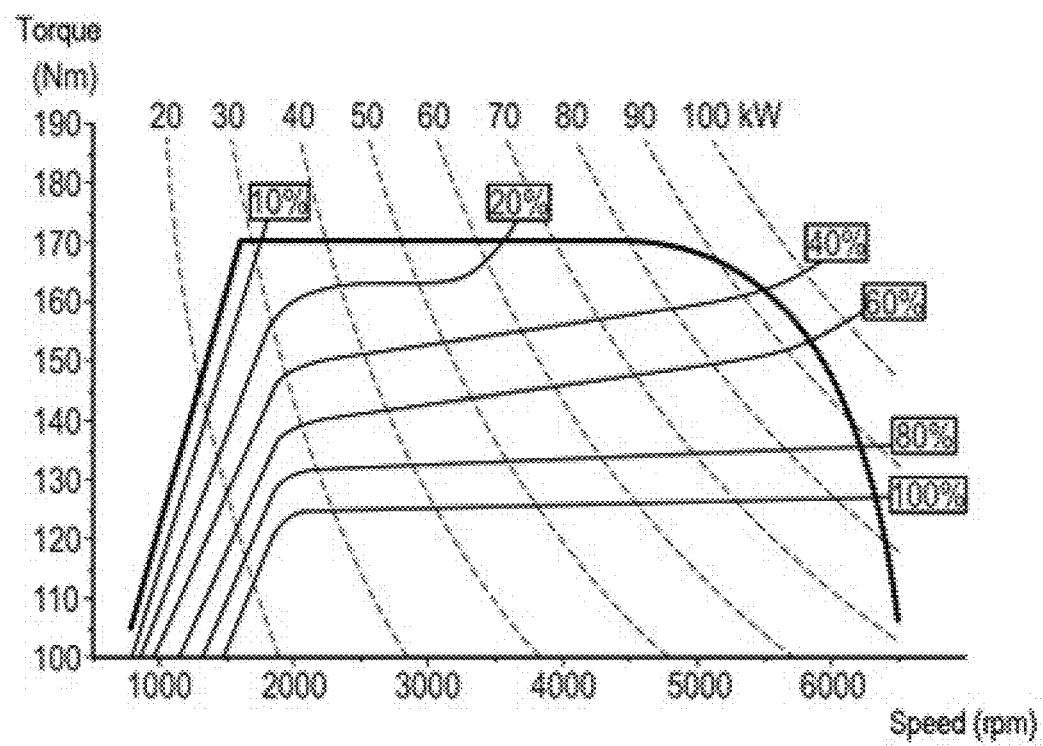
FIG. 6 shows a diagram illustrating the control strategy for the position of the guide vanes of the turbine according to FIGS. 2A, 2B, and 3.
Figure 7:
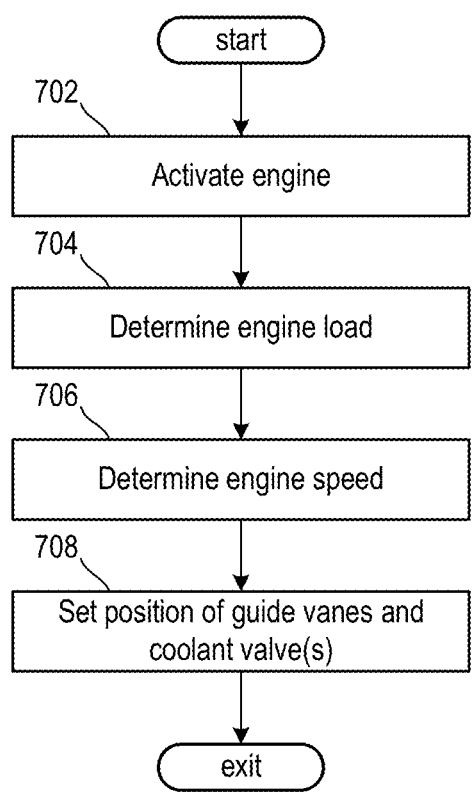
FIG. 7 shows a flow diagram of one embodiment of a method.
Figure 8:
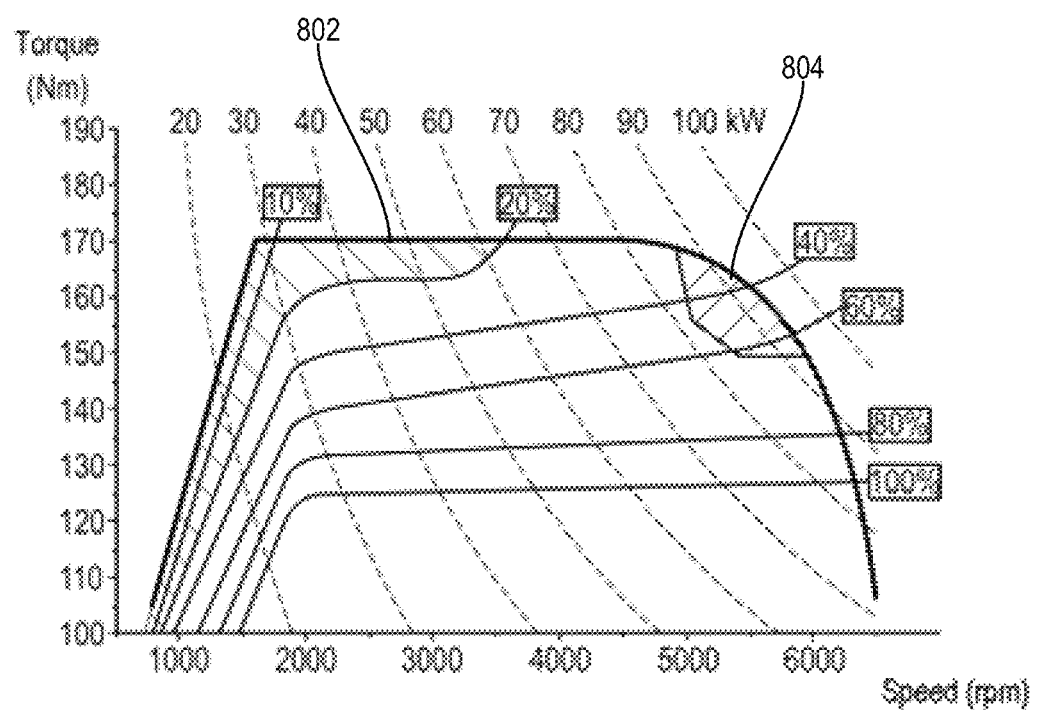
FIG. 8 shows a diagram illustrating the control strategy for the position of a valve in the cooling jacket of a compressor.
Figure 9:
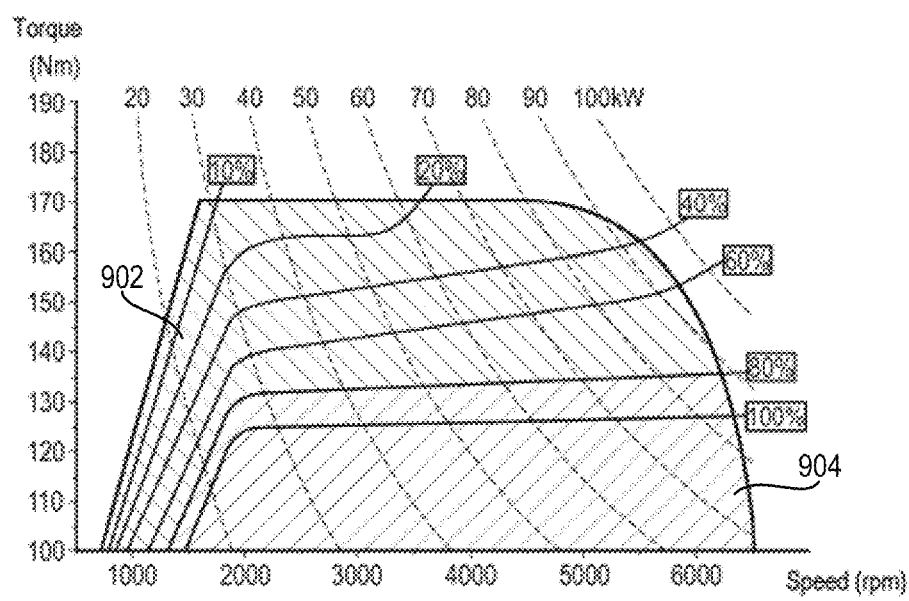
FIG. 9 shows a diagram illustrating the control strategy for the position of a valve in the cooling jacket of the turbine.

The guide vanes may be actuated to a plurality of positions between the fully closed and fully open positions, as illustrated via the plotted control strategy in FIG. 6. FIGS. 8 and 9 illustrate desired coolant valve positions for the compressor and the turbine, respectively. A method for operating the turbocharger is illustrated in FIG. 7.

A first aspect of the disclosure relates to an assembly comprising an exhaust turbocharger having main components comprising a variable-geometry turbine, which is arranged in the exhaust tract of an internal combustion engine, and a compressor, which is arranged in the intake tract of the internal combustion engine, which each have a casing, wherein a cooling jacket is integrated into at least one of the casings, and the turbine has at least one guide vane, which can be rotated about its axis and the position of which can be varied via a first lever connected to an actuator, characterized in that the cooling jacket in the casing of at least one main component of the exhaust turbocharger has at least one valve for controlling the flow of a coolant, said valve being connected via a further lever to the actuator.

The setting of the guide vanes with control of the cooling of an exhaust turbocharger are combined into operation of a single actuator. The cooling may be regulated in a manner dependent on the operating state of the internal combustion engine. In some examples, use of the actuator, which is used to set the position of the guide vanes, is used to adjust the valve and therefore there is no need for an extra actuator for the valve. Space and costs are thereby saved. The disclosure is also suitable for controlling the cooling of further components of an exhaust turbocharger.

In the assembly according to the disclosure, a certain angle of the position of the guide vanes corresponds to a certain opening status of the valve. In this case, the valve can be coupled to the actuator in such a way that the valve is opened when the angle of the guide vanes is increased. The coupling can also be set in such a way that the valve is closed when the angle of the guide vanes is increased. Here, the adjustment of the valve can take place with a delay, with the result that the valve is adjusted only when a certain angle of the guide vanes is reached. For this purpose, it is possible to set threshold values, the overshooting or undershooting of which changes the opening status of the valve. Provision can also be made for the valve to be opened when a first threshold value is reached and closed again when a second threshold value is reached. It is defined that the "closed" state in respect of the valve does not mean a 100%-closed state, but an approximately closed state, e.g. by 90%, in order to ensure a coolant flow in the case of large temperature and pressure differences in the coolant.

In another embodiment of the assembly according to the disclosure, the main component is the turbine. In this case, the cooling jacket thereof has at least one first valve, which is connected via a second lever to the actuator. It is thereby possible for the first valve to be adjusted when the guide vanes are adjusted. The cooling of the turbine can thereby be regulated in a speed-dependent manner.

In another embodiment of the assembly according to the disclosure, the main component is the compressor. The cooling jacket thereof has at least one second valve, which is connected via a third lever to the actuator. It is thereby made possible for the second valve to be adjusted when the guide vanes are adjusted. The cooling of the compressor can thereby be regulated in a load-dependent manner. It is envisaged here that the second valve is opened at high loads as long as the guide vanes do not exceed a certain degree of opening. At a high load, the degree of opening of the guide vanes varies between closed and largely open. By virtue of the coupling of the second valve to the actuator, the second valve may be open until the degree of opening of the guide vanes reaches a certain threshold value. In this operating state, coolant should flow through the cooling jacket of the compressor casing in order to cool the charge air. At low loads, no coolant flow may be desired in the compressor casing because the coolant could instead heat the charge air.

The actuator in the assembly according to the disclosure may be driven electrically.

Likewise, the actuator in the assembly according to the disclosure is driven hydraulically or via a vacuum drive.

A second aspect of the disclosure relates to a motor vehicle having an assembly according to the disclosure.

A third aspect of the disclosure relates to a method for controlling a coolant flow in a component of an exhaust turbocharger in an assembly according to the disclosure. The method may include operating the internal combustion engine, detecting the load of the internal combustion engine, detecting the speed of the internal combustion engine, setting the opening status of the first valve or the second valve as a function of the load and the speed.

The first valve may be closed when the speed is below a first threshold value as a function of load. At high load and low speeds, the material of the turbine is exposed to relatively low temperatures. In this operating condition, as much energy of the exhaust gas as possible may be used to drive the turbine. In this case, the guide vanes may be closed, with the result that as far as possible the entire exhaust gas quantity is directed onto the rotor blades. In this operating situation, the thermal loading of the turbine material is lower. By virtue of the coupling of the first valve to the actuator, the first valve is likewise closed. Thus, only a small amount of coolant can flow through the cooling jacket of the turbine casing, with the result that no significant (e.g., minimal) cooling is provided. As already mentioned above, cooling cannot be blocked completely because, in that case, the coolant may boil or evaporate when the valve is closed. It is only possible to reduce, but not to completely avoid, the heat transfer or the heat transfer coefficient of the coolant via the coolant flow.

The first valve may be opened when the speed is above a second threshold value as a function of load. At high load and high speeds, a high mass flow of hot exhaust gas is passed through the turbine, with the result that the material of the turbine is exposed to high temperatures. In this operating state, the guide vanes are opened, with the result that a large part of the exhaust gas is passed through the turbine without driving the rotor blades. Through the action of the actuator, the valve is also opened, thus allowing coolant to flow through the cooling jacket of the turbine casing. It is thereby possible to provide turbine cooling, which is desired in this operating situation.

The second valve may be closed when the load is below a threshold value as a function of speed. At low loads, the guide vanes are largely open. In this operating state, the second valve is closed owing to the coupling to the actuator, with the result that only a small amount of coolant can flow through the casing of the compressor.

The second valve may be opened when the load is above a threshold value as a function of speed. It is envisaged here that the second valve is opened at high loads as long as the guide vanes do not exceed a certain degree of opening. At a high load, the degree of opening of the guide vanes varies between closed and largely open. By virtue of the coupling of the second valve to the actuator, the second valve may be open until the degree of opening of the guide vanes reaches a certain threshold value. In this operating state, coolant may flow through the cooling jacket of the compressor casing in order to cool the material of the compressor.

An assembly 1 for an internal combustion engine 2 having a turbocharger 3 is illustrated in FIG. 1. The turbocharger 3 has a turbine 4 and a compressor 5, the wheels of which are connected to one another for conjoint rotation via a shaft in a shaft bearing 6. According to FIG. 1, the internal combustion engine 2 has three cylinders, without being restricted thereto. From the internal combustion engine 2, the exhaust gas is discharged from the cylinders via exhaust lines 7, which converge via a manifold to form an exhaust tract 8. The turbine 4 is arranged in the exhaust tract 8 downstream of the internal combustion engine 2. The turbine wheel is driven by the exhaust gas flow produced by the internal combustion engine 2 by burning fuel. The rotation of the turbine wheel is transmitted to the compressor wheel by the shaft.

A catalytically active device 9 for exhaust gas purification is arranged downstream of the turbine 4. As catalytically active devices, it is possible to provide a three-way catalytic converter, an oxidation catalytic converter, a nitrogen oxide storage catalytic converter, a particle filter with a catalytically acting coating and/or a catalytic converter for selective catalytic reduction, for example.

The compressor 5 is arranged in an intake tract 10. In the compressor, charge air is compressed and passed to the internal combustion engine 2. A charge air cooler 11 is arranged in the intake tract 10 downstream of the compressor 5. The intake tract 10 branches via an intake manifold into intake lines 12, each of which is connected to one cylinder of the internal combustion engine 2.

The turbine 4 has a turbine casing 40, in which a turbine cooling jacket 41 is arranged. The compressor 5 has a compressor casing 50, in which a compressor cooling jacket 51 is arranged. The cooling jackets 41, 51 are each connected to a coolant line of a coolant circuit of the corresponding motor vehicle. The coolant circuit can be a high-temperature or low-temperature coolant circuit.

Arranged in the turbine cooling jacket 41 is a first valve 42, which serves to control a coolant flow in the cooling jacket 41. It is also possible for the first valve 42 to be arranged outside the turbine cooling jacket 41, in a coolant line (not shown) leading from the coolant circuit to the turbine cooling jacket 41.

Arranged in the compressor cooling jacket 51 is a second valve 52, which serves to control a coolant flow in the compressor cooling jacket 51. It is also possible for the second valve 52 to be arranged outside the compressor cooling jacket 51, in a coolant line (not shown) leading from the coolant circuit to the compressor cooling jacket 51.

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include an engine speed sensor, an engine load sensor, and the like. Other sensors such as additional pressure, temperature, air/fuel ratio, and composition sensors may be coupled to various locations in the vehicle system 106. As another example, the actuators may include an actuator 20 as illustrated in FIGS. 3, 4, and 5.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, the engine 2 is arranged on a hybrid vehicle, which comprises multiple sources of torque available to one or more vehicle wheels 159. In the example shown, vehicle includes engine 2 and an electric machine 151. Electric machine 151 may be a motor or a motor/generator. A crankshaft of engine 2 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

The turbine 4 has movable guide vanes 43. FIG. 2A shows the turbine 4 with closed guide vanes 43, i.e. the degree of opening of the guide vanes 43 is 0%. In this status, the exhaust gas flow is directed completely onto the rotor blades 44 in order to drive the turbine wheel 45. FIG. 2B shows the turbine 4 with open guide vanes 43, i.e. the degree of opening of the guide vanes 43 is 100%. In this status, the exhaust gas flow is directed past the rotor blades 44 through the turbine 4 without driving the turbine wheel 45. The arrows in each case indicate the flow direction of the exhaust gas. The rotation arrow in the center of the turbine wheel 45 shows the direction of rotation.

To move the guide vanes 43, as illustrated in FIG. 3, an actuator 20, which is connected to at least one guide vane of the guide vanes 43 via a first lever 21, is provided. In the turbine 4 there are corresponding structures, via which, when the actuator 20 is actuated, all the guide vanes can be moved in corresponding fashion. The actuator 20 is controlled by a control device, such as controller 112 of FIG. 1, which issues control commands for setting a certain degree of opening of the guide vanes 43 in accordance with the operating condition of the internal combustion engine 2.

In a first embodiment of the assembly according to the disclosure, the actuator 20 is connected to the first valve 42 via a second lever 22. In this connection, FIG. 4 illustrates that the actuator 20 is configured as an electric motor with an electric connection 24 to a battery (e.g., battery 161 of FIG. 1), which moves the guide vanes via the first lever 21 and, at the same time, moves the first valve 42 via the second lever 22. It is also possible for the actuator 20 to be configured as a lever moved by a hydraulic drive 25 or by a vacuum drive, as shown in FIG. 5. The arrows on the first valve 42 indicate the flow of the coolant. The rotation arrows indicate the rotary motion brought about by the actuator 20.

In this way, FIGS. 4 and 5 illustrates two embodiments of the single actuator 20 configured to actuate the first valve or the second valve and the guide vanes synchronously. In the example of FIG. 4, the actuator 20 is rotated about an axis 91, which results in actuation of the first valve and the guide vanes. In the example of FIG. 4, the first lever 21 and the second lever 22 are coupled to a common linkage 90. Thus, the common linkage 90 is actuated via actuation of the actuator 20, resulting in actuation of each of the guide vanes 43 and the first valve 42.

In a second embodiment of the assembly according to the disclosure, the actuator 20 is connected to the second valve 52 via a third lever 23. As already mentioned above, the actuator 20 in FIG. 5 is a hydraulic drive, but is not restricted thereto. In FIG. 5, the guide vanes are moved by means of the actuator 20 via the first lever 21, and, at the same time, the second valve 51 is moved via the third lever 23. The arrows on the second valve 52 indicate the flow of the coolant. The rotation arrows indicate the rotary motion brought about by the actuator 20.

As illustrated in FIG. 5, the actuator 20 comprises a common linkage 92 comprises three linkage ports. In the example of FIG. 5, the third lever 23 is physically coupled to a first linkage port and the first lever 21 is physically coupled to a second linkage port. The third linkage port is illustrated vacant in the example of FIG. 5. However, in some embodiment of the present disclosure, the second lever 22 may be physically coupled to the third linkage port. In this way, the actuator 20 may move each of the guide vanes 43, the first valve 42, and the second valve 52.

A power diagram relating to the control of the degree of opening of the guide vanes 43 is shown in FIG. 6. In this case, the speed of the internal combustion engine 2 is plotted on the horizontal axis, and the torque of the internal combustion engine 2 is plotted on the vertical axis. The dashed lines extending at a slight diagonal slope from the top left to the bottom right of the diagram are the power curves of the internal combustion engine 2 measured in kilowatts (kW). The bold black line indicates the maximum torque that can be provided at a certain speed. The lines with the percentage indications correspond to the degree of opening of the guide vanes 43. It may be desired that the guide vanes are not opened or opened only slightly at speeds less than 1500 rpm (e.g., a first threshold speed). At a higher torque or higher load (up to 10% in the region of the "knee point", up to 20% at a high torque and a medium speed, in order to use as much as possible of the exhaust gas to drive the turbine wheel 45), the guide vanes 43 may be moved to more open positions. The higher the speed and the lower the torque, the higher is the degree of opening of the guide vanes 43. In the region of the rated power of the internal combustion engine 2, the degree of opening of the guide vanes 43 is approximately between 40 and 60%.

FIG. 7 illustrates a method 700 according to the disclosure for controlling a coolant flow in a component of an exhaust turbocharger via an assembly according to FIG. 4 or 5. Instructions for carrying out method 700 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The internal combustion engine 2 is operated at 702. At 704, the load of the internal combustion engine 2 is detected. At 706, the speed of the internal combustion engine 2 is detected. At 708, the opening status of the valve in the corresponding cooling jacket is controlled as a function of the load and the speed. The valve(s) and guide vane positions may be set via actuation of the single actuator. The actuator may be adjusted clockwise or anti-clockwise to adjust the positions to more open or less open positions.

In one example, the actuator is moved in a first direction to move the guide vanes and the first valve in the first direction. Additionally or alternatively, the actuator is moved in a second direction to move the guide vanes and the second valve in the second direction, opposite the first direction. In one example, the first direction may correspond to opening the first valve and the guide vanes and the second direction may correspond to closing the first valve and the guide vanes.

In the first embodiment of the assembly according to the disclosure, the cooling of the turbine 4 is controlled during the movement of the guide vanes 43 for controlling the power of the internal combustion engine by coupling the actuator 20 to the first valve 42. In FIG. 8, it is indicated in the power diagram that the first valve 42 is closed or remains closed at a degree of opening of the guide vanes 43 of up to 20% (area 802 hatched diagonally from the top left to the bottom right), ensuring that no coolant flows into the cooling jacket 41. In this operating state, the entire exhaust gas energy may be used to drive the turbine wheel 45 and for the operation of the catalytic converters 9. Cooling of the turbine 4 may not be desired.

At a high load and a high speed, the exhaust gas temperatures are very high, however, with the result that it becomes desired to reduce heat transfer to the turbine material. At a degree of opening of the guide vanes 43 in a range of 35-65%, the first valve 42 is opened (area 804 hatched diagonally from the bottom left to the top right, FIG. 8), with the result that coolant flows into the cooling jacket 41.

In the area between the hatched areas (between a degree of opening of the guide vanes 43 of 20 and 35%), the first valve 42 can transition gradually from one state of opening into the other, with the result that the coolant flow begins or ceases gradually. At a larger degree of opening of the guide vanes 43 than 65%, the first valve 42 can also be closed again.

In the second embodiment of the assembly according to the disclosure, the cooling of the compressor 5 is controlled during the movement of the guide vanes 43 for controlling the power of the internal combustion engine by coupling the actuator 20 to the second valve 52. In FIG. 9, it is indicated in the power diagram that the second valve 52 is open at a degree of opening of the guide vanes 43 of up to 80%, thus enabling coolant to flow into the compressor cooling jacket 51 (area hatched 902 diagonally from the top left to the bottom right). In this way, cooling of the compressor is provided at high loads.

At a degree of opening of the guide vanes 43 of over 80%, the second valve 52 is closed, thus ensuring that no coolant can flow into the compressor cooling jacket 51 (area 904 hatched diagonally from the bottom left to the top right). The possibility of intake air being heated by relatively hot coolant is thereby avoided at low loads.

FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

In this way, a single actuator may be used to adjust a position of a plurality of guide vanes of a turbine and a coolant valve. The coolant valve may be configured to adjust coolant flow through a coolant jacket of a turbine or of a compressor. The technical effect of using the single actuator to adjust the guide vanes and coolant flow is to decrease a packaging size and complexity of a turbocharger.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a turbocharger comprising an actuator is the only actuator configured to adjust a position of a plurality of guide vanes and a position of a turbocharger coolant valve.

2. The system of claim 1, wherein a guide vane of the plurality of guide vanes is mechanically coupled to the actuator via a first lever, and wherein the turbocharger coolant valve is mechanically coupled to the actuator via a second lever.

3. The system of claim 1, wherein the actuator is electrically driven.

4. The system of claim 1, wherein the actuator is hydraulically driven.

5. The system of claim 1, wherein the actuator is driven via a vacuum.

6. The system of claim 1, wherein the turbocharger coolant valve controls coolant flow through one or a turbine cooling jacket or a compressor cooling jacket.

7. A turbocharger system, comprising:
an actuator configured to adjust a position of a plurality of guide vanes and a position of a turbine coolant valve.

8. The turbocharger of claim 7, wherein the turbine coolant valve is opened once the plurality of guide vanes are moved to a threshold open position.

9. The turbocharger of claim 7, wherein a first lever mechanically couples at least one guide vane of the plurality of guide vanes to the actuator, and wherein a second lever mechanically couples the turbine coolant valve to the actuator.

10. The turbocharger of claim 7, wherein the actuator, the plurality of guide vanes, and the turbine coolant valve are configured to rotate synchronously.

11. The turbocharger of claim 7, wherein the actuator is configured to adjust the position of the plurality of guide vanes and the position of the turbine coolant valve in response to an engine speed and an engine load.

12. The turbocharger of claim 7, wherein the position of the plurality of guide vanes and the position of the turbine coolant valve are closed during engine loads greater than a threshold load and engine speeds less than a threshold speed.

13. The turbocharger of claim 12, wherein the position of the plurality of guide vanes and the position of the turbine coolant valve are open during engine loads greater than the threshold load and engine speeds above the threshold speed.

14. A turbocharger system, comprising:
an actuator configured to adjust a position of a plurality of guide vanes and a position of a compressor coolant valve.

15. The turbocharger system of claim 14, wherein the compressor coolant valve is opened once the plurality of guide vanes are moved to a threshold open position, wherein the compressor coolant valve is configured to adjust a coolant flow through a compressor coolant jacket.

16. The turbocharger of claim 14, wherein a first lever mechanically couples at least one guide vane of the plurality of guide vanes to the actuator, and wherein a second lever mechanically couples the compressor coolant valve to the actuator, and wherein the actuator, the plurality of guide vanes, and the compressor coolant valve are configured to rotate synchronously.

17. The turbocharger of claim 14, wherein the actuator is configured to adjust the position of the plurality of guide vanes and the position of the compressor coolant valve in response to an engine speed and an engine load.

18. The turbocharger of claim 14, wherein the position of the plurality of guide vanes and the position of the turbine coolant valve are closed at engine loads less than a threshold load.

19. The turbocharger of claim 18, wherein the position of the plurality of guide vanes and the position of the turbine coolant valve are open at engine loads greater than the threshold load.

* * * * *